United States Patent
Nakamizo et al.

(10) Patent No.: US 6,659,094 B2
(45) Date of Patent: Dec. 9, 2003

(54) BREATHING DEVICE FOR INTERNAL COMBUSTION ENGINE

(75) Inventors: Keiichi Nakamizo, Hyogo (JP); Shinya Akase, Kobe (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 10/360,424

(22) Filed: Feb. 7, 2003

(65) Prior Publication Data
US 2003/0150437 A1 Aug. 14, 2003

(30) Foreign Application Priority Data
Feb. 8, 2002 (JP) .......................................... 2002-031995

(51) Int. Cl.[7] .............................................. F01M 13/00
(52) U.S. Cl. ....................................................... 123/572
(58) Field of Search ................................. 123/572, 573, 123/574, 41.86

(56) References Cited

U.S. PATENT DOCUMENTS

| | | | | |
|---|---|---|---|---|
| 5,529,045 A | * | 6/1996 | Bauer et al. | 123/572 |
| 5,647,337 A | * | 7/1997 | Johnson et al. | 123/572 |
| 6,234,154 B1 | * | 5/2001 | Spix | 123/572 |
| 6,431,159 B2 | * | 8/2002 | Nishi et al. | 123/572 |

* cited by examiner

*Primary Examiner*—Marguerite McMahon

(57) ABSTRACT

To provide a breathing device for an internal combustion engine, wherein the structure around the check valve is simplified so that the engine as a whole can be manufactured compact, the breathing device includes a check valve (34) for fluid connecting, a crank chamber (27) and a rocker arm chamber (31) in the combustion engine. The check valve (34) is disposed in a head gasket (35) that is interposed between a cylinder block (6) and a cylinder head (7). The check valve (34) is in the form of a reed valve separate from the head gasket (35) and is supported by the head gasket (35) by means of a rivet (36).

18 Claims, 7 Drawing Sheets

BREATHING DEVICE FOR INTERNAL COMBUSTION ENGINE

BACKGROUND OF THE INVENTION

1. Field of the Invention

The present invention relates to an internal combustion engine and, more particularly, to a breathing device used in the engine to relieve an internal pressure inside a crankcase.

2. Description of the Prior Art

A breathing device is known as a device which, when an internal pressure inside a crank chamber increases as a result of movement of a piston under suction and expansion strokes, operates to suck a blow-by gas from the crank chamber and then introduce it into a rocker arm chamber and also, if necessary, to circulated the blow-by gas towards an inside of an air cleaner. The breathing device is generally provided with an oil separation mechanism for separating an oil component from the blow-by gas during circulation of the blow-by gas. This oil separation mechanism generally includes an oil separation chamber and a check valve both disposed inside a rocker cover mounted atop a cylinder head of the engine.

However, in the breathing devices, since the structure is complicated and the number of component parts is relatively large, the cost of assembling is high and the design limitation is stringent. Also, while the check valve must have a sufficient response to opening or closing and a sufficient sealability in order to secure the performance, the check valve tends to become bulky in order to fulfill the requirements, resulting in increase in size of the engine.

The engine with the check valve disposed inside the crank case is also known, but even this engine has problems similar to those discussed above.

SUMMARY OF THE INVENTION

In view of the foregoing, the present invention is intended to provide an improved breathing device for a combustion engine, wherein the structure around the check valve is simplified so that the engine as a whole can be manufactured compact.

To this end, the present invention provides a breathing device for an internal combustion engine which includes a check valve for fluid connecting a crank chamber and a rocker arm chamber in the engine. The check valve is disposed in a head gasket that is interposed between a cylinder block and a cylinder head of the engine.

With the breathing device for the combustion engine according to the present invention, as compared with the structure in which the check valve is disposed inside the rocker arm chamber or the crankcase such as in the prior art, the structure around the check valve can be simplified to an extent that is resulted from elimination of the use of any member which would otherwise be required to support the check valve. Accordingly, it is possible to reduce the cost and the size of the combustion engine, with the design limitation on the combustion engine being lessened.

In a preferred embodiment of the present invention, the check valve is in the form of a reed valve that is separate from the head gasket and supported by the head gasket.

This substantially eliminates the use of any special casing and sealing mechanism in the breathing device and, therefore, the number of component parts can advantageously be reduced, resulting in further reduction in cost.

In another preferred embodiment of the present invention, the check valve has a longitudinal axis and also has a support portion and a flapper portion opposite to the support portion, in which the support and flapper portions occupy respective positions on the longitudinal axis of the check valve and spaced apart from each other. The check valve has an elongate slot defined therein so as to extend in a direction perpendicular to the longitudinal axis thereof.

Where the breathing device is constructed in this way, the rigidity of the check valve can be sufficiently lowered by the slot with no need to increase the length of the check valve and, therefore, the check valve can have an increased response to opening or closing with small size. Since the check valve can be made in small size in this manner, the check valve can easily be disposed in the head gasket where a space is limited for interposition thereof between the cylinder block and the cylinder head. Also, where the check valve is mounted on the head gasket with the support portion thereof fixedly secured to the head gasket by a fixing member, such as a rivet, the presence of the elongate slot is effective to minimize reduction in sealability which would otherwise occur when the check valve warps, and any possible increase of the rigidity can advantageously be avoided, which would occur as a result of deformation of the support portion of the check valve to a concave shape in a transverse section.

In a further preferred embodiment of the present invention, the head gasket has a portion confronting an intermediate portion of the check valve generally intermediate between the support and flapper portions, which portion of the head gasket is formed with a recess that defines a space between it and the check valve.

In such case, because of the presence of the recess defined in the portion of the head gasket confronting the intermediate portion of the check valve, it is possible to avoid any possible sticking of the check valve to the head gasket by the effect of the viscosity of the oil component.

In a still further preferred embodiment of the present invention, the check valve is formed integrally with a section of the head gasket.

Formation of the check valve integrally with the head gasket makes it possible for a valve mechanism of the breathing device to be simplified in structure along with reduction in number of component parts used.

In a still further preferred embodiment of the present invention, a stopper is defined in the cylinder head for regulating an opening of the check valve. Since the stopper for regulating the opening of the check valve is formed on the cylinder head, no element functionally corresponding to the stopper is needed to be formed separately, resulting in simplification of the structure.

In a still further preferred embodiment of the present invention, the head gasket is in the form of a metallic plate coated with a rubber material. The use of this head gasket is effective to increase the sealability between the check valve and the head gasket.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

With reference to the accompanying drawings, preferred embodiments of the present invention will be described in detail. Specifically, FIGS. 1 and 2 show a four-cycle overhead valve engine according to a first preferred embodiment of the present invention in a front sectional view and a fragmentary side view, respectively.

Figure 1:
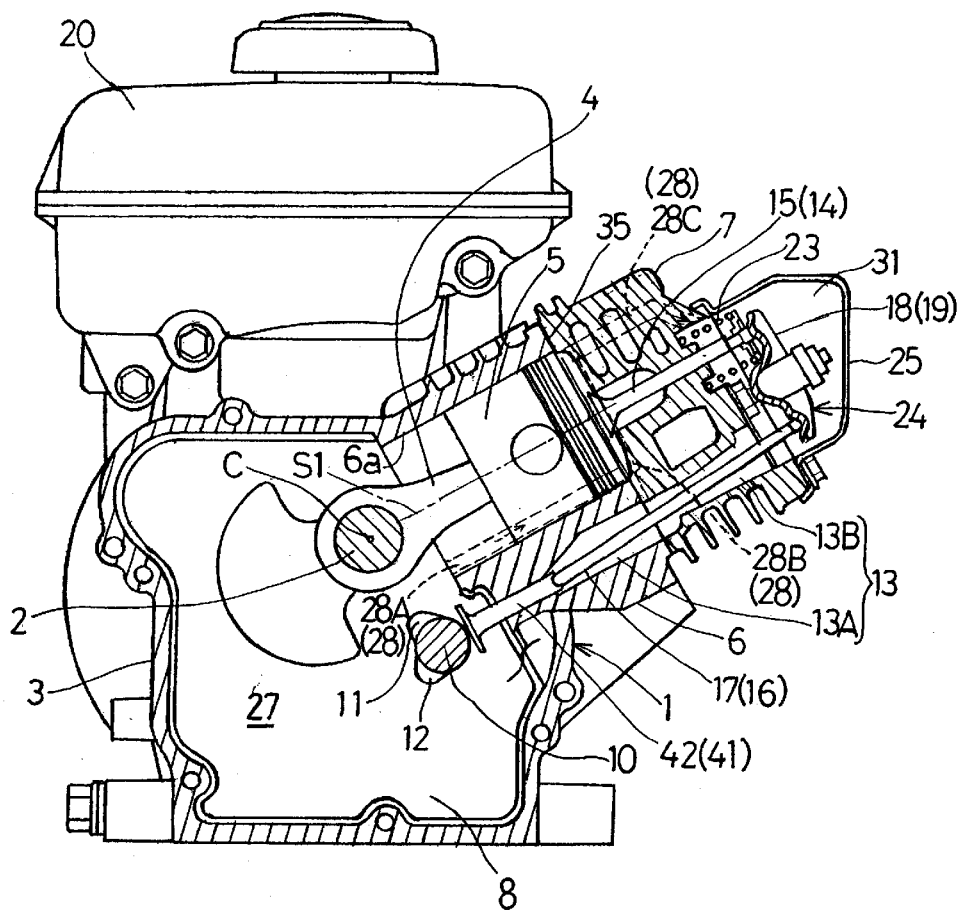
FIG. 1 is a front sectional view of a four-cycle overhead valve engine provided with a breathing device according to a first preferred embodiment of the present invention.
Figure 2:
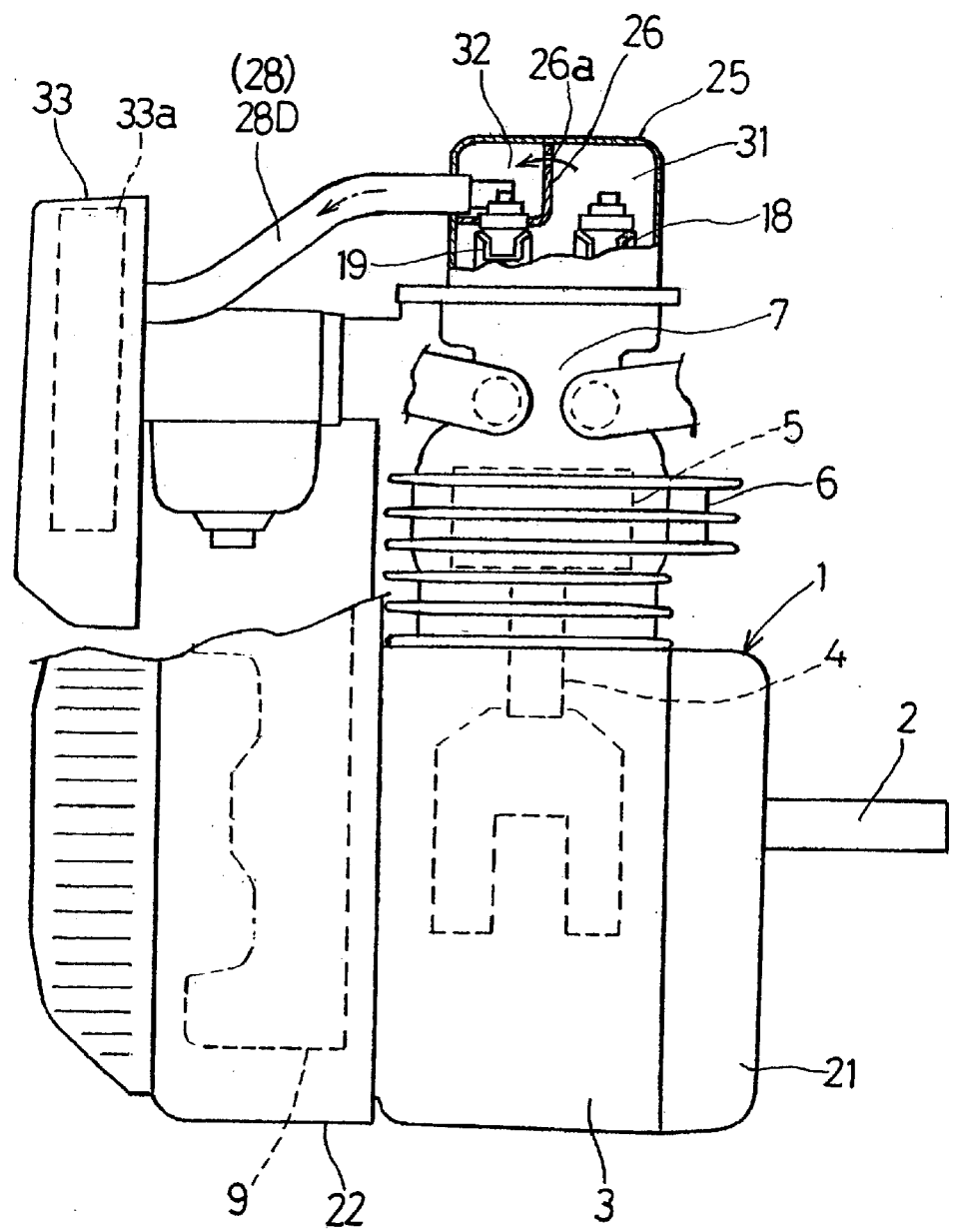
FIG. 2 is a side view of the four-cycle overhead valve engine shown in FIG. 1.

As shown in FIG. 1, the four-cycle overhead valve engine includes a engine body 1 provided with a crankcase 3 for rotatably supporting a horizontally lying crankshaft 2, a cylinder block 6 formed integrally with the crankcase 3, a piston 5 drivingly connected with the crankshaft 2 through a connecting rod 4 and accommodated within a cylinder bore 6a defined in the cylinder block 6 for sliding movement within the cylinder bore 6a, and a cylinder head 7 separate from the cylinder block 6 and mounted atop the cylinder block 6. The cylinder bore 6a of the cylinder block 6 has a longitudinal axis S1 and is disposed with its longitudinal axis S1 inclined relative to a horizontal direction and also to a vertical direction so that a top portion of the cylinder block 6 is diagonally upwardly oriented. The crankcase 3 has a bottom area defined as an oil sump 8. In FIG. 1, a power output end of the crankshaft 2 is on a forward side (front side) of the drawing sheet. In FIG. 2, the power output end of the crankshaft 2 is shown in a right-hand portion of the drawing and a flywheel 9 is provided on an opposite end portion of the power output end of the crankshaft 2, that is, a left-hand portion of the drawing of FIG. 2. The flywheel 9 concurrently serves as an engine cooling fan. The crankcase 3 has a front area opening outwardly to define a front opening which is in turn closed by a side cover 21. A fuel tank 20 shown in FIG. 1 is supported atop the crankcase 3.

A cam shaft 10 rotatably supported by the crankcase 3 so as to extend parallel to the crankshaft 2 has two cam members 11 and 12 mounted thereon in different phases for rotation together therewith and spaced a distance from each other in a direction lengthwise of the cam shaft 10 while being offset relative to each other in a direction circumferentially of the cam shaft 10. Rotation of the crankshaft 2 is transmitted to the cam shaft 10 through a gear train (not shown) and, accordingly this cam shaft 10 rotates in unison with the crankshaft 2. An underside portion of a side wall of the inclined cylinder block 6, that is positioned under the cylinder bore 6a, more particularly positioned diagonally downwardly of the cylinder bore 6a, has a lower chamber area 13A of a push rod chamber 13 defined therein so as to extend along the cylinder bore 6a while an upper chamber area 13B communicated with the lower chamber area 13a to define the push rod chamber 13 is defined in the cylinder head 7. A pair of push rods 16 and 17 for driving intake and exhaust valves 14 and 15, respectively, are movably accommodated within the push rod chamber 13. These push rods 16 and 17 have their lower ends adapted to engage the respective cam members 11 and 12 through associated tappets 41 and 42 and, accordingly, the push rods 16 and 17 can be driven up and down by the cam members 11 and 12 through the associated tappets 41 and 42 during rotation of the crankshaft 2.

Mounted atop the cylinder head 7 is a pair of rocker arms 18 and 19 that are engaged at one end thereof with upper ends of the push rods 16 and 17, respectively. Opposite ends of these rocker arms 18 and 19 remote from the associated push rods 16 and 17 are engaged respectively with the intake and exhaust valves 14 and 15 that are operatively supported by the cylinder head 7 through return springs 23. Thus, it will readily be seen that the push rods 16 and 17, the rocker arms 18 and 19, and the return springs 23 altogether form respective valve gears 24 for driving the intake and exhaust valves 14 and 15, respectively, in synchronism with rotation of the crankshaft 2 in a manner well known to those skilled in the art. A head cover 25 is mounted atop the cylinder head 7 to define between the head cover 15 and the cylinder head 7 a compartment that is divided by a partition wall 26, shown in FIG. 2, into a rocker arm chamber 31, within which the rocker arms 18 and 19 are enclosed, and a gas-liquid separation chamber 32. It is to be noted that the partition wall 26 has a small perforation 26a defined therein for communicating the rocker arm chamber 31 and the gas-liquid separation chamber 32 with each other.

A crank chamber 27 defined in a lower region of the crankcase 3 and the rocker arm chamber 31 above the cylinder head 7 are communicated with each other through a breather passage 28. This breather passage 28 defines a gas flow path through which a blow-by gas emerging from the crank chamber 27 when a pressure inside the crank chamber 27, which increases as a result of movement of the piston 5 under intake and expansion strokes, is relieved from the crank chamber 27 can be circulated to an intake air passage of the engine through the rocker arm chamber 31. The breather passage 28 is made up of a first passage portion 28A that is defined in a lower portion of the side wall of the inclined cylinder block 6 adjacent the push rods 16 and 17 and on one side thereof adjacent the flywheel 9 so as to extend from the crank chamber 27 to a top face of the cylinder block 6 along the longitudinal axis S1 of the cylinder bore 6a, a second passage portion 28B communicated with the first passage portion 18A and defined in the cylinder head 7 so as to extend in a direction away from the push rods 16 and 17, a third passage portion 28C communicated with the second passage portion 28B and defined in a side wall of the cylinder head 7 at a location remote from the push rods 16 and 17 (i.e., on one side of the longitudinal axis S1 opposite to the upper chamber area 13B of the push rod chamber 13) so as to extend towards and communicate with the rocker arm chamber 31, and a fourth passage portion 28D defined by a connecting tube as shown in FIG.

2 and extending from the gas-liquid separation chamber 32 to an outlet side of a cleaner element 33a in an air cleaner 33.

Figure 3:
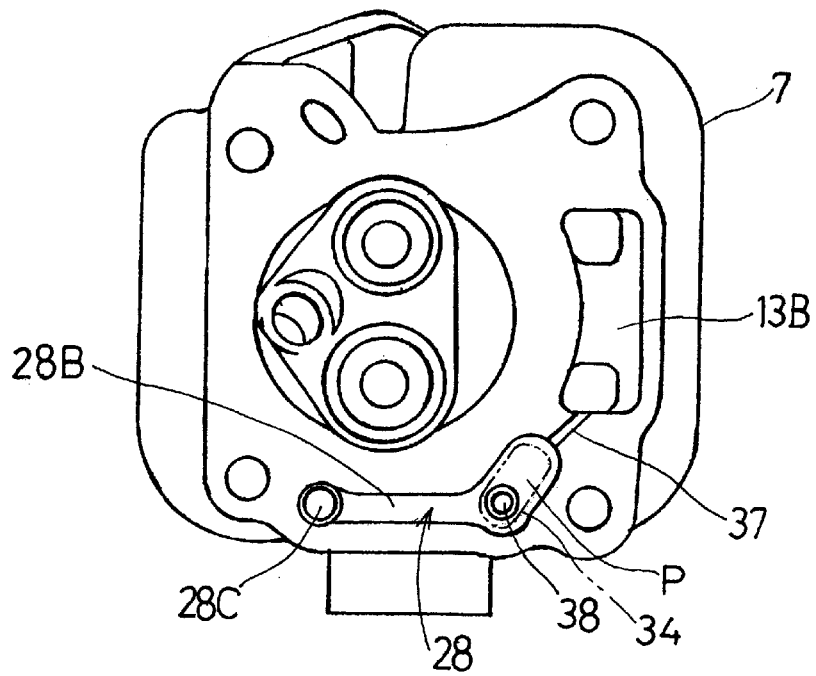
FIG. 3 is a bottom view of the four-cycle overhead valve engine shown in FIG. 1, showing a cylinder head thereof.
Figure 5:
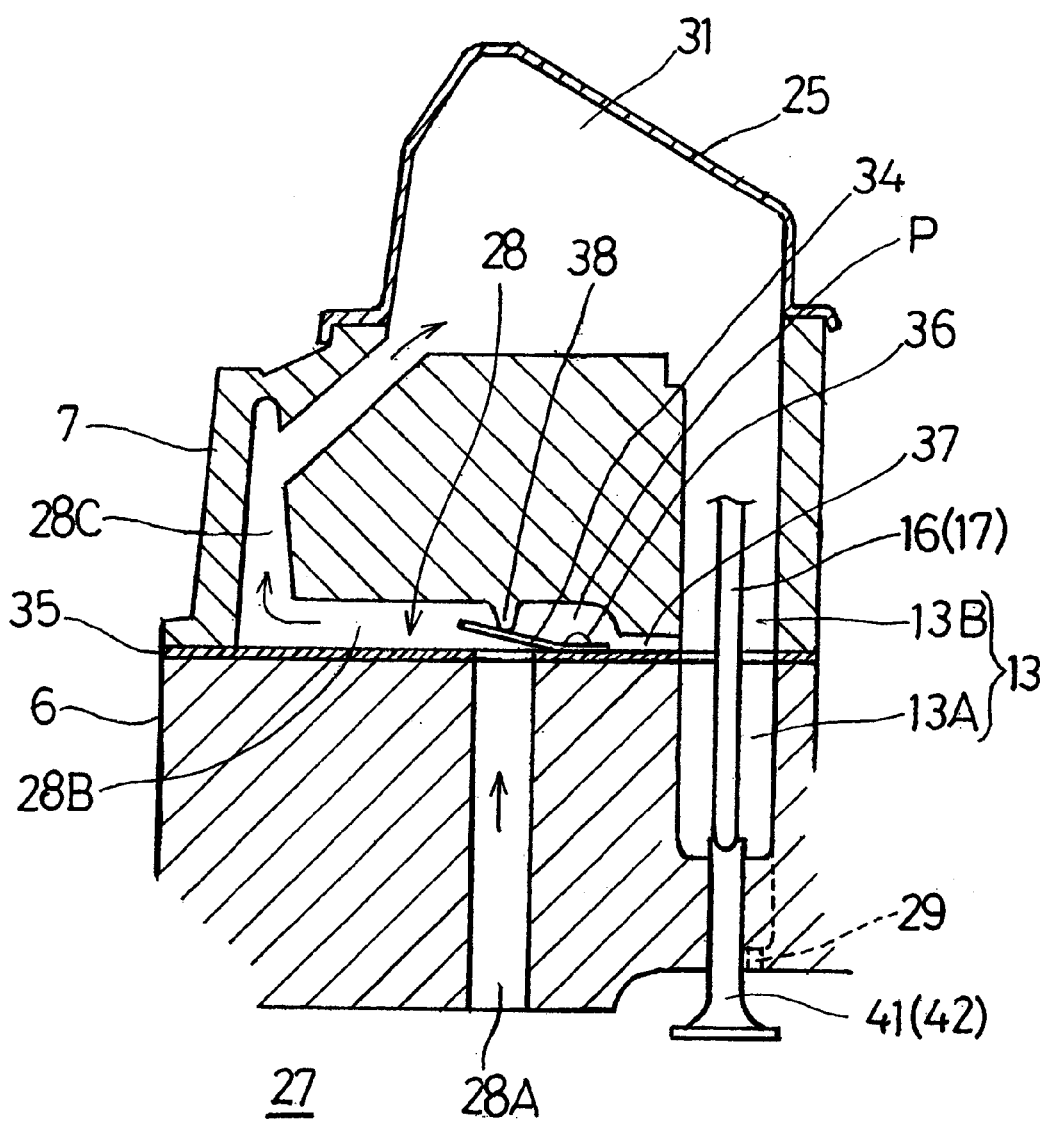
FIG. 5 is a cross-sectional view taken along the line V—V in FIG. 4.

Referring now to FIG. 3 showing a bottom plan view of the cylinder head 7, the second passage portion 28B of the breather passage 28 referred to above is defined in a bottom surface of the cylinder head 7. Also, as shown in FIG. 5, a check valve 34 for the breather passage 28 is positioned at a junction between the first and second passage portions 28A and 28B. This check valve 34 is operable to allow the flow of the blow-by gas in a first direction from the crank chamber 27 towards the rocker arm chamber 31, but prevents the flow in a second direction reverse to the first direction and is disposed in a head gasket 35 that is interposed between the cylinder block 6 and the cylinder head 7 for sealing therebetween.

Figure 4:
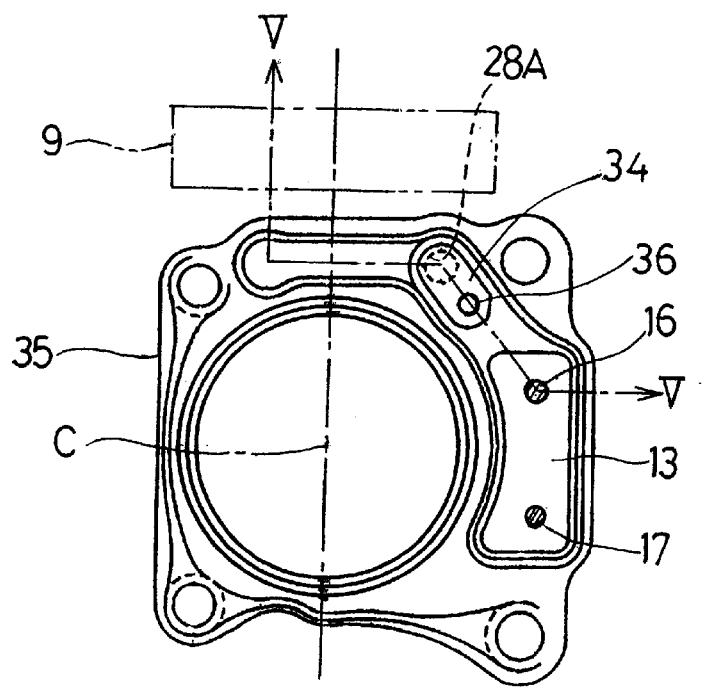
FIG. 4 is a plan view of a head gasket used in the four-cycle overhead valve engine shown in FIG. 1.

In the illustrated embodiment, the head gasket 35 is prepared from a coated metal, a plane view of which is shown in FIG. 4. In this figure, to clearly show the relation in position between the head gasket 35 and a crank axis C represented by the longitudinal axis of the crankshaft, a crank axis C and the flywheel 9 are shown by respective phantom lines. The check valve 34 is in the form of a reed valve having one end riveted at 36 to the head gasket 35 and is hence supported by the head gasket 35. The reed valve forming the check valve 34 is made of a synthetic resin.

As shown in FIG. 5, a portion P of the breather passage 28 downstream of the check valve 34 at the junction between the first and second passage portions 28A and 28B with respect to the direction of flow of the blow-by gas, shown by the arrow-headed line, and the push rod chamber 13 are communicated with each other by means of an oil return passage 37. This oil return passage 37 is, as best shown in FIG. 3, formed in an undersurface of the cylinder head 7 at a location adjacent the portion P of the breather passage 28 downstream of the check valve 34. This undersurface of the cylinder head 7 is also formed with a stopper 38 for regulating the opening of the check valve 34 as shown in FIG. 5.

In the engine of the structure discussed above, when the internal pressure inside the crank chamber 27, shown in FIG. 1, which increases as a result of movement of the piston 5 under the intake and expansion strokes, is to be relieved from the crank chamber 27, the blow-by gas flows, as indicated by the arrow-headed lines, from the crank chamber 27 towards the rocker arm chamber 31 through the breather passage 28, particularly by way of the first, second and third passage portions 28A, 28B and 28C thereof and is then circulated from the rocker arm chamber 31 towards the inside of the air cleaner 33 through the gas-liquid separation chamber 32 and the fourth passage portion 28D of the breather passage 28. At this time, at the junction between the first and second passage portions 28A and 28B of the breather passage 28 as best shown in FIG. 5, since the internal pressure inside the crank chamber 27 has increased as described above, the check valve 34 is then opened to allow the blow-by gas to flow in the first direction from the crank chamber 27 towards the rocker arm chamber 31, thus establishing a recirculation circuit. On the other hand, when the piston, 5 is under the compression and exhaust strokes, a negative pressure prevails inside the crank chamber 27 and, therefore, the check valve 34 is closed to prevent the blow-by gas from flowing in the second direction opposite to the first direction.

It is to be noted that while the check valve 34 is closed, an oil component contained in the blow-by gas then flowing within the second and third passage portions 28B and 28C may flow backwards towards the check valve 34 and then accumulate at and in the vicinity of the portion P of the breather passage 28 downstream of the check valve 34. However, this oil component so accumulating can flow into the push rod chamber 13 by way of the oil return passage 37 and is then returned back to the crank chamber 27 from the lower chamber area 13A of the push rod chamber 13 by way of a return port 29 defined in the cylinder block 6 at a location laterally of the tappets 41 and 42. Also, when the blow-by gas flows from the rocker arm chamber 31 into the gas-liquid separation chamber 32 through the perforation 26a defined in the partition wall 26 within the compartment inside the head cover 25 shown in FIG. 2, the oil component mixed in the blow-by gas is separated and left within the rocker arm chamber 31, therefore, the blow-by gas substantially free of the oil component can be circulated to the inside of the air cleaner 33. The oil component left within the rocker arm chamber 31 shown in FIG. 5 is returned back to the crank chamber 27 through the push rod chamber 13 and then though the return port 29.

According to the foregoing construction, since the check valve 34 in the breather passage 28 is disposed in the head gasket 35 interposed between the cylinder block 6 and the cylinder head 7, no extra element which would otherwise be required to support the check valve is needed as compared with the prior art in which the check valve is disposed in either the rocker arm chamber or the crankcase. Accordingly, the structure of the engine in the vicinity of the check valve 34 can advantageously be simplified, resulting not only in reduction in cost and size of the engine, but also in corresponding lessening of the design limitation hitherto imposed on the engine.

Also, since the check valve 34 comprising the reed valve is supported by the head gasket 35, neither a special casing or a sealing mechanism as the breather device can be conveniently dispensed with and the number of component parts and the cost can be correspondingly reduced. In addition, since the stopper 38 for regulating the opening of the check valve 34 is formed integrally with the cylinder head 7, no extra element is needed to construct a stopper mechanism and, accordingly, simplification and reduction in number of component parts can both be achieved, resulting in further reduction in cost. Yet, since the head gasket 35 is coated with a rubber material, a sufficient sealing can be achieved between it and the check valve 34.

Figure 6:
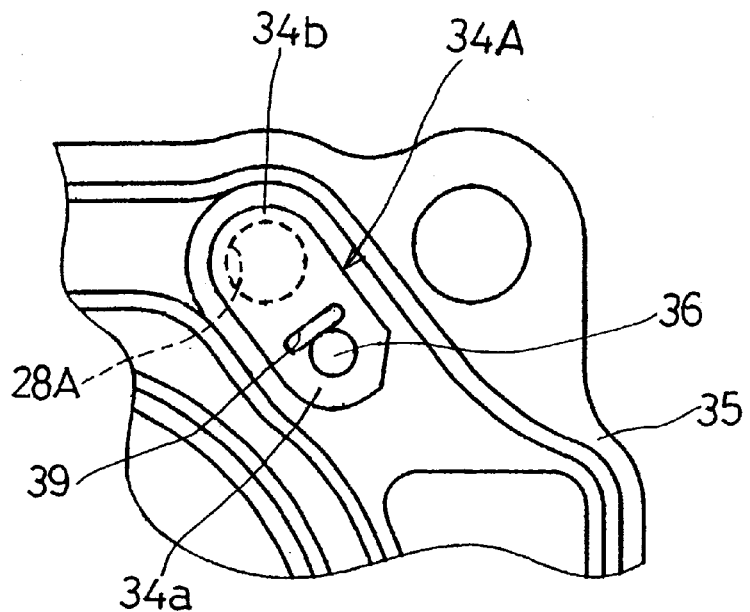
FIG. 6 is a plan view of the breathing device according to a second preferred embodiment of the present invention, showing a check valve used therein.
Figure 7:
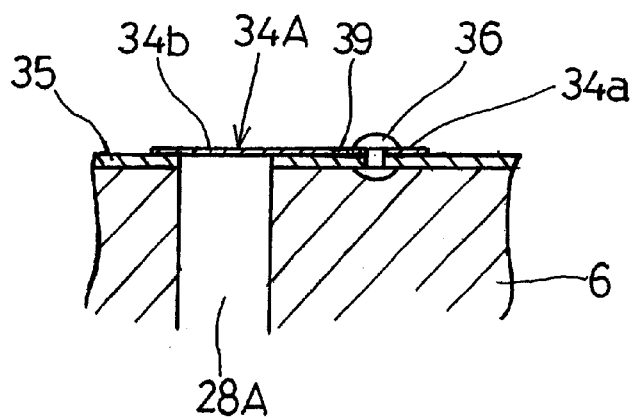
FIG. 7 is a cross-sectional view taken along the line VII—VII in FIG. 6.

FIG. 6 illustrates, in an enlarged plane view, the check valve 34A according to a second preferred embodiment of the present invention and FIG. 7 illustrates a cross-sectional view taken along the line VII—VII in FIG. 6. In the check valve 34A shown in FIG. 6, a support portion 34a of the check valve 34A, through which the check valve 34A is secured to the head gasket 35 by means of a rivet 36, and a flapper portion 34b of the check valve 34A for selectively opening and closing the first passage portion 28A of the breather passage 28 occupy respective positions lying on a longitudinal axis of the check valve 34A and spaced apart from each other along the longitudinal axis thereof, and an elongate slot 39 is defined in the check valve 34A at a location generally intermediate between these portions 34a and 34b of the check valve 34A so as to extend completely across the thickness of the check valve 34A with a longitudinal axis of the elongate slot 39 lying in a direction perpendicular to the longitudinal axis the check valve 34A. As best shown in FIG. 7, this check valve 34A is in the form of a flat plate member.

It is noted that in the absence of the elongate slot 39 in the check valve 34A, a reed member forming the reed valve and, hence, the check valve 34A must have a substantial length to thereby reduce the rigidity where the response of the check valve 34A to open or close is desired to be increased. However, the longer the check valve 34A is, the more stringent the space for installation of the check valve 34A on the head gasket 35 is rendered.

In view of the above, the use has been made of the elongate slot 39 in the check valve 34A so that the rigidity of the check valve 34A can be lowered with no need to render the check valve 34A to have a substantial length and, hence, the response of the check valve 34A to open or close can advantageously be increased. In other words, the presence of the elongate slot 39 in the check valve 34A makes it possible to employ a relatively compact check valve and, accordingly, the check valve 34A having the elongate slot 39 can easily be secured to the head gasket 35. Also, the presence of the elongate slot 39 in the check valve 34A is effective to avoid an undesirable reduction in sealability which would occur as a result of warping of the check valve 34A when the latter is mounted on the head gasket 35 with the support portion 34a thereof firmly secured to the head gasket 35 by means of the rivet 36. In addition, mounting of the check valve 34A with the support portion 34a riveted to the gasket 35 in the manner described previously is effective to avoid any possible increase of the rigidity which would occur as a result of deformation of the support portion 34a of the check valve 34A to a concave shape in a transverse section.

Figure 8:
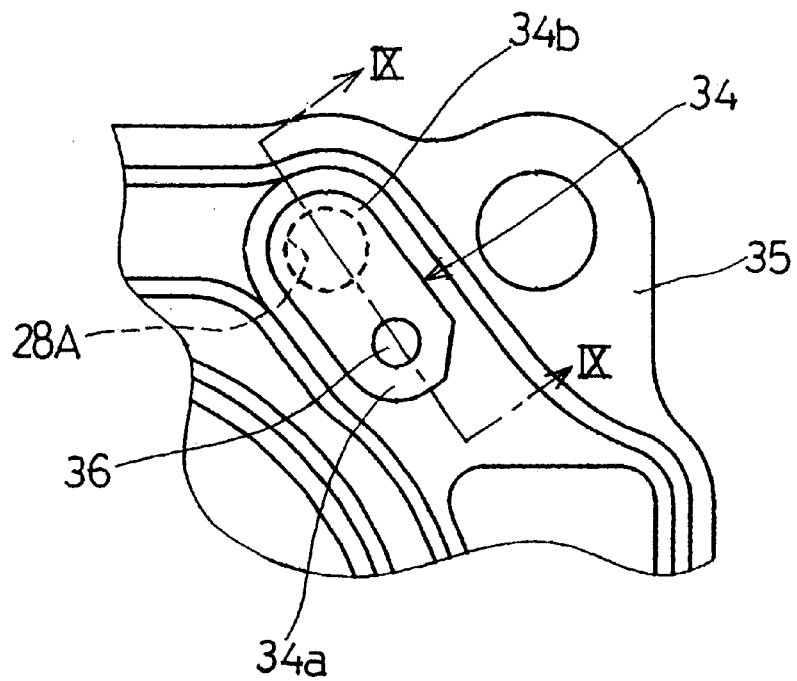
FIG. 8 is a plan view, on an enlarged scale, showing the check valve used in the breathing device according to a third preferred embodiment of the present invention.
Figure 9:
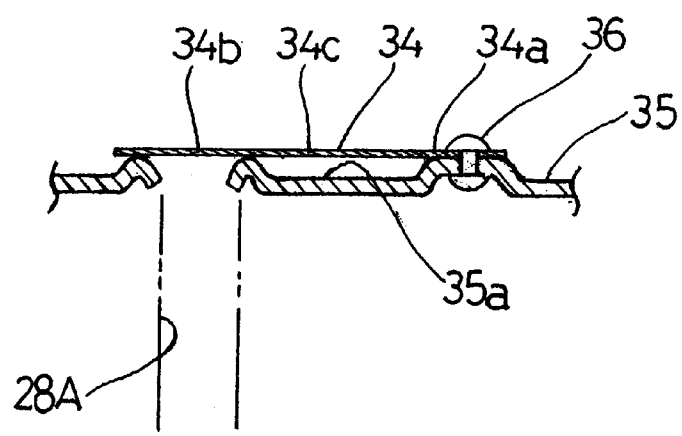
FIG. 9 is a cross-sectional view taken along the line IX—IX in FIG. 8.

FIG. 8 illustrates, in an enlarged plan view, the check valve according to a third preferred embodiment of the present invention, and FIG. 9 is a cross-sectional view taken along the line IX—IX in FIG. 8. In a breathing structure shown in FIG. 8, a portion of the head gasket 35 that confronts a portion 34c of the check valve 34 generally intermediate between the support portion 34a thereof, through which the check valve 34 is secured to the head gasket 35 by means of the rivet 36, and the flapper portion 34b thereof for selectively opening and closing the first passage portion 28A of the breather passage 28, is formed with a recess or a depression 35a to define a space between the head gasket 35 and the check valve 34 as best shown in FIG. 9.

Formation of the recess 35a in that portion of the head gasket 35 confronting the generally intermediate portion 34c of the check valve 34 is effective to avoid any possible sticking of the check valve 34 to the head gasket 35 which would occur by the effect of the viscosity of the oil component.

It is to be noted that the check valve 34 employed in the practice of the third embodiment of the present invention may be of a structure similar to the check valve 34A shown in FIGS. 6 and 7, that is, may have the elongate slot shown by 39 in FIGS. 6 and 7. Even though the check valve 34 shown in FIGS. 8 and 9 has the elongate slot as is the case with the check valve 34A shown in FIGS. 6 and 7, undesirable sticking of the check valve 34 to the head gasket 35 can be effectively avoided.

Figure 10:
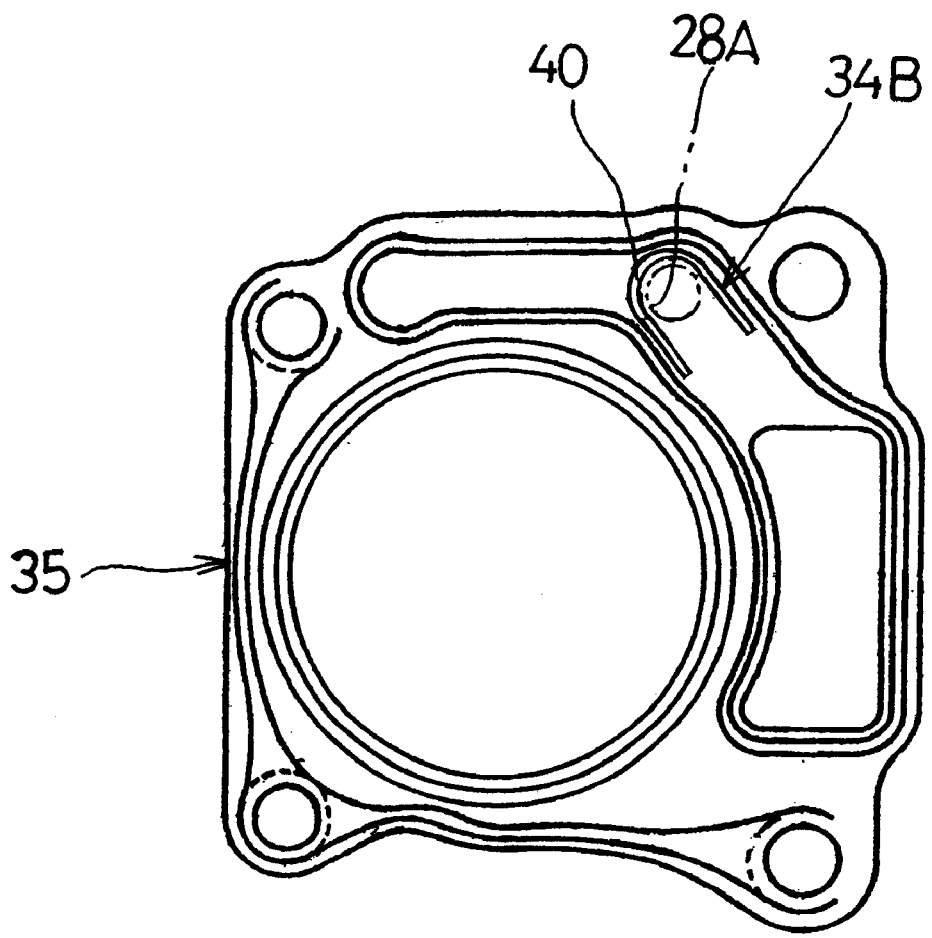
FIG. 10 is a plan view showing the check valve of the breathing device according to a fourth preferred embodiment of the present invention.

FIG. 10 illustrates, in a plan view, the check valve 34B according to a fourth preferred embodiment of the present invention. In this embodiment, the check valve 34B is defined integrally with a section of the head gasket 35. Specifically, the check valve 34B is defined by forming a generally U-shaped crevice 40 in the head gasket 35 so as to leave a correspondingly U-shaped flap which in effect acts as the check valve 34B.

According to the fourth embodiment described above, since the check valve 34B is formed integrally with the section of the head gasket 35, the structure necessary to form the check valve 34B can be simplified, accompanied by reduction in number of the component parts.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A breathing device for an internal combustion engine which comprises a check valve for fluid connecting a crank chamber and a rocker arm chamber in the combustion engine, said check valve being disposed in a head gasket that is interposed between a cylinder block and a cylinder head of the engine.

2. The breathing device as claimed in claim 1, wherein the check valve is in the form of a reed valve that is separate from the head gasket and supported by the head gasket.

3. The breathing device as claimed in claim 2, wherein the check valve has a longitudinal axis and also has a support portion and a flapper portion opposite to the support portion, said support and flapper portions occupying respective positions on the longitudinal axis of the check valve and spaced apart from each other, said check valve having an elongate slot defined therein so as to extend in a direction perpendicular to the longitudinal axis thereof.

4. The breathing device as claimed in claim 2, wherein the check valve has a longitudinal axis and also has support portion and a flapper portion opposite to the support portion, and wherein said head gasket has a portion confronting an intermediate portion of the check valve generally intermediate between the support and flapper portions, said portion of the head gasket being formed with a recess that defines a space between it and the check valve.

5. The breathing device as claimed in claim 1, wherein the check valve is formed integrally with a section of the head gasket.

6. The breathing device as claimed in claim 1, wherein said cylinder head is formed with a stopper for regulating an opening degree of the check valve.

7. The breathing device as claimed in claim 1, wherein said head gasket is in the form of a metallic plate coated with a rubber material.

8. In an internal combustion engine having a crank case connected to an engine block, a cylinder head mounted on the engine block and a rocker cover connected to the cylinder head, the improvement of a head gasket comprising:

a head gasket unit of a size to seal the engine block to the cylinder head including a valve portion supported by the head gasket unit between the engine block and cylinder head to control fluid flow.

9. The head gasket of claim 8 wherein the valve portion is integrally formed with the head gasket unit.

10. The head gasket of claim 8 wherein the head gasket unit has a valve opening and the valve portion is secured to the head gasket unit on one side of the valve opening.

11. The head gasket of claim 8 wherein the valve portion is approximately flush with the head gasket.

12. The head gasket of claim 8 wherein the valve portion is substantially flat and extends substantially co-planar to the head gasket unit with a valve open operatively positioned in the head gasket unit beneath the valve portion.

13. The head gasket of claim 8 wherein the engine block includes a first passageway fluidically connected with the crank case and the cylinder head includes a second passageway fluidically connected with the first passageway through a valve opening in the head gasket and the valve portion is operatively positioned relative to the valve opening to provide a check valve movement to pass fluid flow from the first passageway to the second passageway while blocking fluid flow from the second passageway to the first passageway.

14. In an internal combustion engine having an engine block and a cylinder head mounted on the engine block with a fluid passageway extending between the engine block and the cylinder head, the improvement of a head gasket comprising:

a check valve mounted in the head gasket and operatively positioned in the fluid passageway, the check valve including a valve opening in the head gasket and a valve portion extending approximately flush with the head gasket.

15. The head gasket of claim 14 wherein the valve portion includes an opening offset from the valve opening to lessen a resistance to movement of the valve portion relative to the valve opening.

16. The head gasket of claim 14 wherein the valve opening has a raised annular convex perimeter in the head gasket to seat the valve portion.

17. The head gasket of claim 14 wherein the head gasket has a raised portion beneath the valve portion offset from the valve opening to prevent sticking of the valve portion to the head gasket.

18. The head gasket of claim 14 wherein the head gasket is formed of a metallic member coated with a resilient layer.

* * * * *

UNITED STATES PATENT AND TRADEMARK OFFICE
CERTIFICATE OF CORRECTION

PATENT NO.   : 6,659,094 B2
DATED        : December 9, 2003
INVENTOR(S)  : Nakamizo et al.

It is certified that error appears in the above-identified patent and that said Letters Patent is hereby corrected as shown below:

<u>Title page,</u>
Item [73], Assignee, should read -- Kawasaki Jukogyo Kabushiki Kaisha, Hyogo, Japan --

Signed and Sealed this

Twenty-seventh Day of January, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,659,094 B2
DATED : December 9, 2003
INVENTOR(S) : Nakamizo et al.

It is certified that error appears in the above-identified patent and that said Letters Patent is hereby corrected as shown below:

<u>Title page,</u>
Item [73], Assignee, should read -- Kawasaki Jukogyo Kabushiki Kaisha, Hyogo, Japan --

Signed and Sealed this

Twenty-fifth Day of May, 2004

JON W. DUDAS
*Acting Director of the United States Patent and Trademark Office*